July 10, 1956 — M. R. JOHNSON — 2,753,959
BRAKE ROTOR
Filed April 12, 1951 — 2 Sheets-Sheet 1

INVENTOR.
Milton R. Johnson
BY
Atty.

July 10, 1956  M. R. JOHNSON  2,753,959
BRAKE ROTOR

Filed April 12, 1951  2 Sheets-Sheet 2

INVENTOR.
Milton R. Johnson
BY
O. B. Garver
Atty.

United States Patent Office 2,753,959
Patented July 10, 1956

2,753,959
BRAKE ROTOR

Milton R. Johnson, Chicago, Ill., assignor to American Steel Foundries, Chicago, Ill., a corporation of New Jersey Application April 12, 1951, Serial No. 220,579

9 Claims. (Cl. 188—218)

This invention relates to brake rotors of the disk type provided with opposed friction faces radially disposed for engagement between a pair of stators, and is more particularly concerned with the provision of a rotor adapted to be mounted on a wheel and axle assembly of a railway car truck.

Brake rotors of this type usually comprise a cast iron brake ring rigidly mounted upon a steel hub which is subjected to stresses due to heating and expansion of the brake ring when the latter is engaged between the stators. As radial stresses in the steel hub then act to cause compressive stresses in the brake ring, it is an object of the present invention to provide a brake rotor construction in which the brake ring is free to expand and contract without stressing the steel hub and thus materially increasing the service life of the rotor.

This invention further contemplates the provision of a brake rotor in which the brake ring is connected to the steel hub by connecting link means which permit the brake ring to expand responsive to braking engagement of the stators without stressing the steel hub.

This invention further contemplates the provision of a brake rotor construction in which the brake ring is resiliently connected to its steel hub by means of resilient spring members adapted to be flexed responsive to expansion and contraction of the brake ring.

This invention embodies other novel features, details of construction and arrangements of parts which are hereinafter set forth in the specification and claims and illustrated in the accompanying drawings, wherein:

Figure 1:
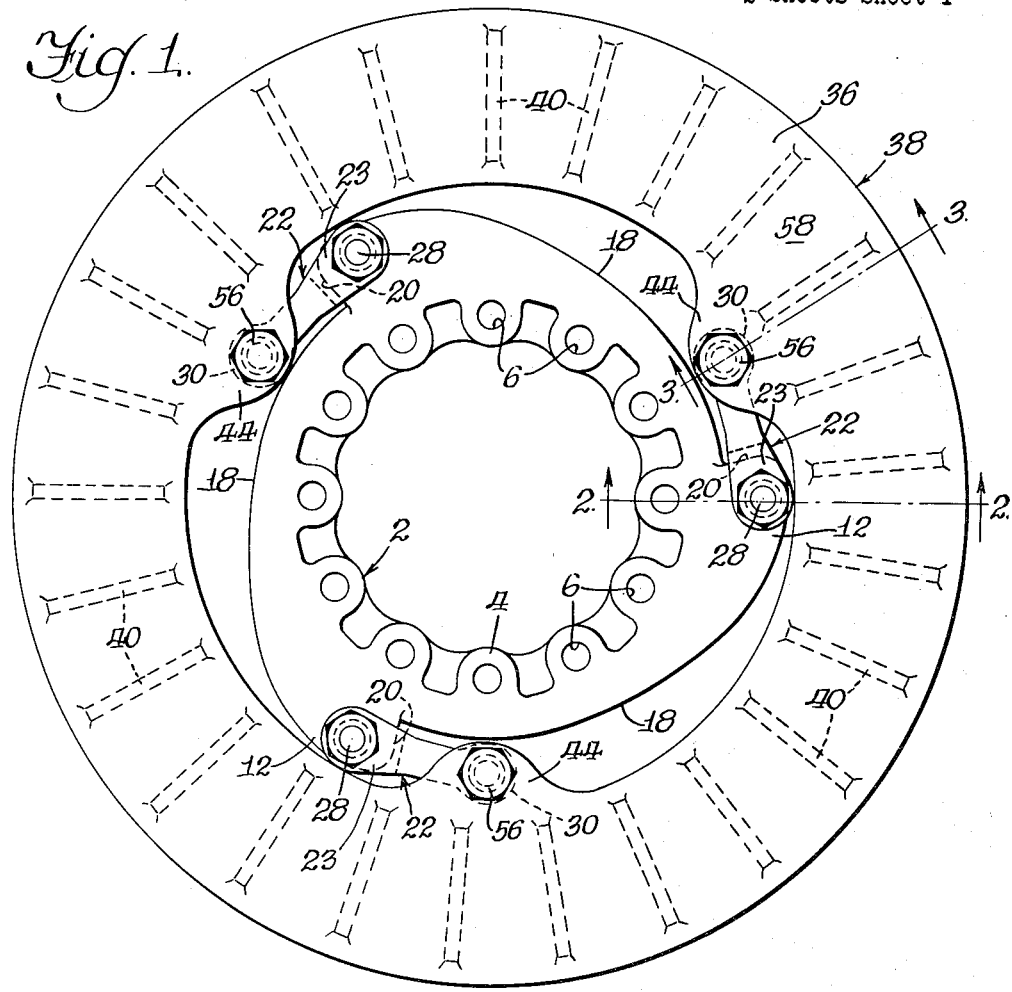
Figure 1 is a side elevational view illustrating a brake rotor embodying features of the present invention.
Figure 2:
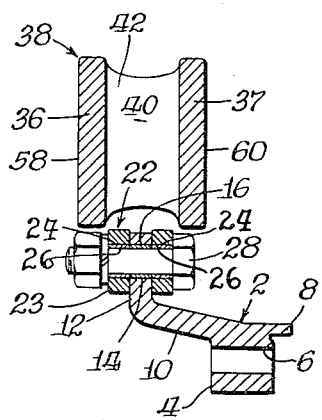
Figure 2 is an enlarged transverse sectional view taken along the line 2—2 of Figure 1.
Figure 3:
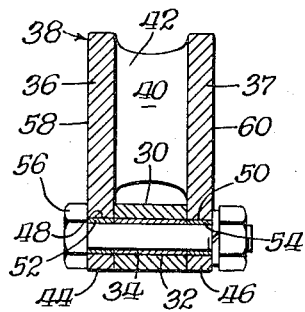
Figure 3 is an enlarged transverse sectional view taken along the line 3—3 of Figure 1.

Referring now to the drawings for a better understanding of the present invention, and more particularly to Figures 1 to 3 therein, the brake rotor is shown as comprising a cast steel hub 2 formed with an annular bolt flange 4 for abutting engagement against the side of a wheel (not shown) of a railway car truck, the flange being provided at spaced intervals with apertures 6 to receive bolt or cap screws (not shown) adapted to secure the hub to the wheel. The hub is also formed with an annular alignment flange 8 projecting inwardly from the outer periphery of the bolt flange 4 having snug telescoping engagement over a complementary annular surface (not shown) provided on the wheel to maintain the hub in fixed concentric relation with respect to the axis of the wheel.

A frusto-conical web 10 projects outwardly from and concentric with the bolt flange 4 and is provided at its outer periphery with a plurality of equally spaced radially disposed ears 12 formed with apertures 14 to snugly receive bushings 16. As illustrated in Figure 1, each ear 12 is defined by an arcuate surface 18 disposed eccentrical with respect to the axis of the web 10 and terminating at a radial surface 20 adjacent its bolt aperture 14.

A plurality of similar connecting links 22 are pivotally connected to their respective ears 12, each link having one of its ends 23 bifurcated to straddle its ear and formed with apertures 24—24 for alignment with the aperture 14 formed in its associated ear 12. Suitable antifriction bearings 26 are press-fitted into the apertures 24 to receive pivot elements such as a bolt and nut assembly 28 which also passes through the bushing 16 in the associated ear 12. The end 30 of each connecting link 22 is formed with an aperture 32 to snugly receive a bushing 34 and is adapted to be disposed between a pair of spaced friction disks 36—37 of a cast iron brake ring 38.

The friction disks 36—37 are secured in spaced parallel relation by means of a plurality of vanes 40 arranged in spaced intervals to define with the disks a plurality of air passageways 42. The inner peripheries of the disks 36—37 are formed at spaced intervals with inwardly projecting bosses 44 and 46, respectively, which are formed with apertures 48 and 50, respectively, to receive bushings 52 and 54, respectively. The connecting links 22 are pivotally connected to their respective bosses 44 and 46 by means of pivot elements, such as bolt and nut assemblies 56.

When the outer faces 58 and 60 of the friction disks 36 and 37 are frictionally engaged between a pair of stators to decelerate the rotor, the brake ring 38 becomes heated and expands to a larger diameter. By providing connecting links 22 between the brake ring 38 and its hub 2 it will be noted that expansion and contraction of the brake ring merely results in pivotal movements of the connecting links and does not set up stresses within the ring or the hub, thus materially increasing the service life of the rotor. It will also be noted that the connecting links 22 preferably extend perpendicular to the axis of the rotor to permit rotation of the rotor in either direction without unduly stressing the links. When the brake ring 38 is in its normal unheated condition, it may be found desirable to have the arcuate surface 18 of the ears 12 in tight contact engagement against the ends 30 of the connecting links to reduce the load transmitted to the links during initial braking engagement of the stators with the brake ring.

Figure 4:
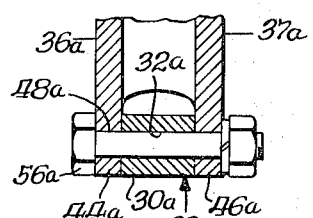
Figure 4 is a fragmentary sectional view, corresponding to Figure 3, illustrating a modified form of the present invention.

Referring now more particularly to Figure 4 in the drawings, a modified form of the present invention is shown as comprising a brake ring 38a embodying friction disks 36a and 37a formed with bosses 44a and 46a which are formed with aligning apertures 48a to receive a bolt and nut assembly 56a. The end 30a of a connecting link 22a is formed with an aperture 32a to receive the bolt and nut assembly 56a. In this form of the invention it will be noted that the bushings are omitted from the apertures formed in the bosses 44a, 46a and connecting link 22a, and that the bolt 56a is press-fitted within the apertures.

Figure 5:
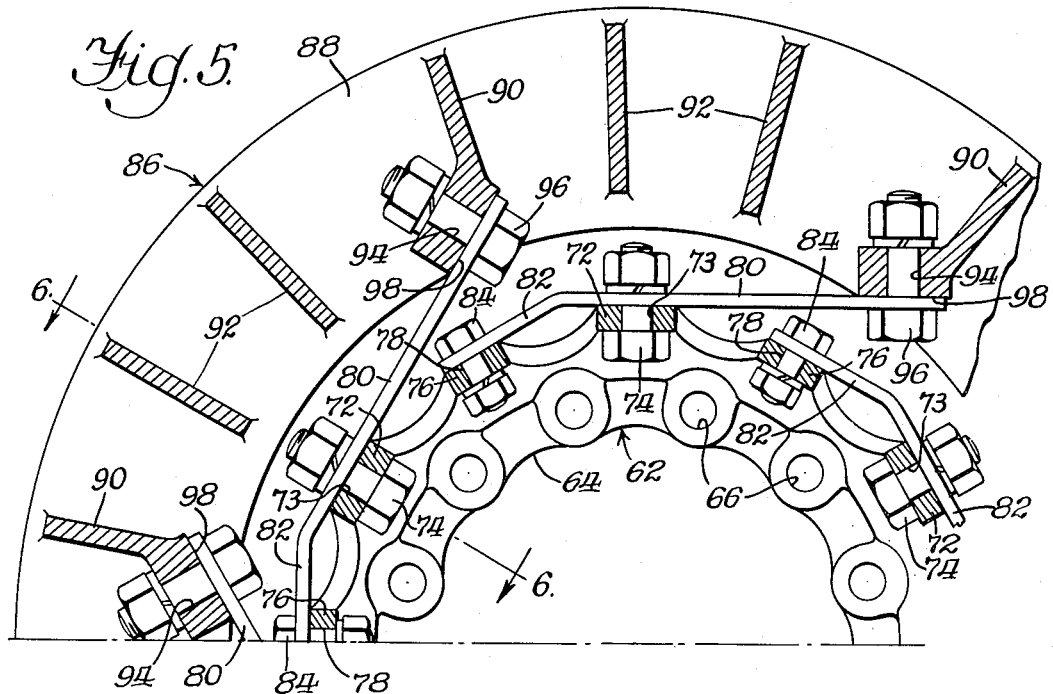
Figure 5 is a fragmentary sectional view, taken along the line 5—5 of Figure 6, illustrating another modified form of the present invention in which the brake ring is resiliently supported from its hub by means of spring members.
Figure 6:
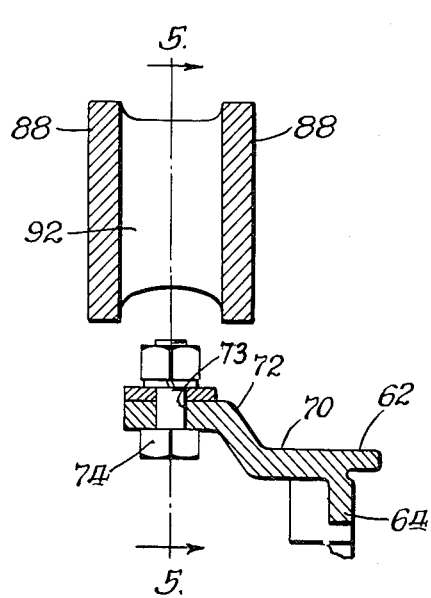
Figure 6 is a transverse sectional view taken along the line 6—6 of Figure 5.
Figure 7:
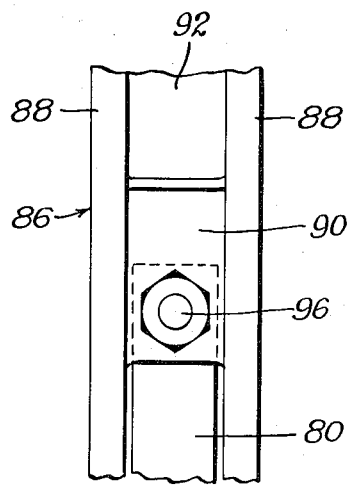
Figure 7 is a fragmentary detail view illustrating the manner in which the spring members connect the brake ring to its hub.

Figures 5, 6 and 7 illustrate another modified form of the present invention in which a cast steel hub 62 is formed with a flange 64 formed at spaced intervals with apertures 66 to receive bolts (not shown) for securing the hub to a railway car wheel. A web 70 projects outwardly from the bolt flange 64 and is provided with a plurality of fingers 72 formed with apertures 74. The web 70 is also formed with a plurality of intermediate fingers 76 located between the fingers 72 and formed with apertures 78. A spring member 80 formed of flat spring metal is secured to each finger 72 by means of a nut and bolt assembly 74, one end of each spring member being angularly disposed at 82 for engagement with an associated auxiliary finger 76 by means of a nut and bolt assembly 84.

A brake ring 86 is shown as combining a pair of friction disks 88—88 secured and spaced in parallel relation by means of attachment vanes 90 and intermediate vanes 92. The attachment vanes 90 are formed with bolt apertures 94 to receive nut and bolt assemblies 96 to secure the free ends of the resilient members 80 against the flat surfaces 98 formed on the inner ends of the attachment vanes.

In the form of the invention illustrated in Figures 5 to 7, it will be noted that the resilient members 80 are adapted to be flexed responsive to variations in diameter of the brake ring 86 in order to avoid stressing the hub 62 or brake ring when the latter is frictionally engaged between a pair of stators to decelerate the rotor.

While this invention has been shown in several forms it is obvious to those skilled in this art that it is not so limited but is susceptible of various changes and modifications without departing from the spirit and scope of the claimed invention.

I claim:
1. In a brake rotor, a brake ring comprising a pair of friction disks secured in spaced relation, a hub coaxially positioned within said brake ring, and a plurality of independent flexibly resilient stress absorbing members circumferentially spaced about the periphery of said hub and secured at their one ends to said brake ring and secured at their other ends to said hub, said members being operative to prevent material stressing of the hub due to expansion of the ring.

2. In a brake rotor, a brake ring comprising a pair of friction disks connected in spaced relation, a hub coaxially positioned within said brake ring, and resilient stress absorbing members circumferentially spaced about the periphery of said hub and connected at their one ends to said brake ring and connected at their other ends to said hub, at least one of said connections being demountable, said resilient members being disposed in planes substantially parallel to the axis of rotation of the rotor.

3. In a brake rotor, a brake ring including a pair of spaced friction disks, vanes extending between the disks to define therewith a plurality of air passageways, a hub including a plurality of circumferentially spaced bosses disposed adjacent the inner peripheries of said friction disks, and a plurality of flat spring metal members connected at one of their ends to said brake ring and connected at their other ends to said bosses, said members being entirely disposed substantially parallel to and secured to the brake ring at equal distances from the axis of rotation of the rotor.

4. In a brake rotor, a brake ring including a pair of spaced friction disks, vanes extending between the disks to define therewith a plurality of air passageways, a hub including a plurality of circumferentially spaced bosses disposed adjacent the inner peripheries of said friction disks, and a plurality of resilient stress absorbing spring members demountably secured at one of their ends to said brake vanes and demountably secured at their other ends to said bosses, said members being operative to prevent material stresses due to expansion of the ring from being transmitted to the hub.

5. In a brake rotor, a brake ring including a pair of spaced friction disks, vanes extending between the disks to define therewith a plurality of air passageways, a hub including a plurality of circumferentially spaced bosses disposed adjacent the inner peripheries of said friction disks, and a plurality of resilient stress absorbing spring members connected at one of their ends to said vanes and connected at their other ends to said bosses, a portion of each spring member extending from its related vane to its related boss in a plane substantially parallel to the axis of rotation of the rotor.

6. In a brake rotor, a brake ring, a separate hub, and a plurality of independent flexibly resilient stress absorbing members interconnecting the hub and ring, said members being operative to prevent stresses due to thermal expansion and contraction of the ring from being transmitted to the hub.

7. In a brake rotor, a brake ring, a separate hub, and a plurality of independent stress absorbing members interconnecting the hub and ring, said members being flexible in bending in response to the thermal expansion and contraction of the ring, whereby stresses due to said expansion and contraction are not transmitted to the hub.

8. In a brake rotor, a brake ring, a separate hub, a plurality of stress absorbing members interposed between the hub and ring and connections at opposite ends of said members to the hub and ring respectively, said members being substantially flat and lying in planes generally parallel to the axis of rotation of the rotor, whereby upon thermal expansion and contraction of said ring said members will be flexed in bending.

9. A brake rotor according to claim 8, wherein certain of said connections between the members and hub and ring, respectively, are demountable connections.

References Cited in the file of this patent

UNITED STATES PATENTS

| 588,261 | Binckley | Aug. 17, 1897 |
| 1,662,585 | Murray | Mar. 13, 1928 |
| 1,674,537 | Williams | June 19, 1928 |
| 1,786,132 | Schwemlein | Dec. 23, 1930 |
| 2,243,334 | Eksergian | May 27, 1941 |
| 2,269,573 | Barry | Jan. 13, 1942 |
| 2,423,056 | Tarbox | June 24, 1947 |
| 2,660,213 | Gilbert | Nov. 24, 1953 |

FOREIGN PATENTS

| 831,661 | France | Sept. 12, 1938 |
| 306,647 | Germany | July 4, 1918 |